US012613256B2

(12) United States Patent
Rivolta et al.

(10) Patent No.: US 12,613,256 B2
(45) Date of Patent: Apr. 28, 2026

(54) IN-SENSOR SHOCK INTENSITY ESTIMATION

(71) Applicant: STMicroelectronics International N.V., Geneva (CH)

(72) Inventors: Stefano Paolo Rivolta, Desio (IT); Federico Rizzardini, Settimo Milanese (IT); Lorenzo Bracco, Chivasso (IT); Marco Bianco, Cesano Boscone (IT); Tae-gil Kang, Seoul (KR)

(73) Assignee: STMicroelectronics International N.V., Geneva (CH)

( * ) Notice: Subject to any disclaimer, the term of this patent is extended or adjusted under 35 U.S.C. 154(b) by 379 days.

(21) Appl. No.: 18/353,678

(22) Filed: Jul. 17, 2023

(65) Prior Publication Data

US 2025/0027970 A1 Jan. 23, 2025

(51) Int. Cl.
G01P 15/08 (2006.01)

(52) U.S. Cl.
CPC ...... G01P 15/08 (2013.01); *G01P 2015/0865* (2013.01)

(58) Field of Classification Search
CPC .. G01P 15/08; G01P 2015/0865; G01P 15/04; G01P 15/18; G01P 15/0891; G01P 2015/0862
See application file for complete search history.

(56) References Cited

U.S. PATENT DOCUMENTS

2013/0054180 A1 2/2013 Barfield
2018/0070889 A1 3/2018 Lee et al.

2019/0041993 A1* 2/2019 Crippa .................... G06F 1/163
2023/0135255 A1* 5/2023 Zhang .................... G06F 3/017
73/493

FOREIGN PATENT DOCUMENTS

JP 2015169542 A 9/2015
JP 2021087741 A 6/2021

OTHER PUBLICATIONS

STMicroelectronics, LSM6DSV16X Data Sheet, May 4, 2023, 198 pages.
Extended European Search Report, EP Application No. 24183339.1, mailed Nov. 18, 2024, 8 pages.
Matteo, Bastico et al., "Simultaneous Real-Time Human Fall Detection and Reidentification Based on Multisensors Data," PETRA 22, Jun. 29-Jul. 1, 2022, Corfu, Greece, 6 pages.

* cited by examiner

*Primary Examiner* — Xin Y Zhong
(74) *Attorney, Agent, or Firm* — Slater Matsil, LLP

(57) ABSTRACT

According to an embodiment, a sensor including a machine learning core (MLC) and a finite state machine (FSM) circuit for detecting a shock event is provided. The MLC continuously calculates a value based on the change in velocity. The FSM circuit compares the value to a first threshold and generates a first interrupt if it is greater than the first threshold. The FSM circuit then compares the value to a second threshold less than the first threshold and generates a second interrupt if it is less than or equal to the second threshold after the first interrupt. The MLC calculates a maximum value between the first and second interrupts and stores it in a register, which is read by an application processor of a host device after receiving the second interrupt. The maximum acceleration norm value is reset after a delay after the second interrupt is generated.

20 Claims, 4 Drawing Sheets

500

IN-SENSOR SHOCK INTENSITY ESTIMATION

TECHNICAL FIELD

The present disclosure generally relates to sensors and, in particular embodiments, to shock intensity estimation.

BACKGROUND

An accelerometer is a sensor that measures acceleration forces along multiple axes. It can detect changes in velocity and movement in any direction relative to its orientation. Microelectromechanical systems (MEMS) accelerometers are typically used in portable electronic devices due to their small size and low power consumption.

An accelerometer can detect shock measurements (i.e., assessing the impact) by measuring sudden acceleration forces acting on the electronic device housing the accelerometer. These forces are translated into electrical signals that are typically processed and analyzed by a processor or onboard computer, external to the sensor. A threshold or trigger level is set to distinguish between normal movements and shock events. If the measured acceleration exceeds this threshold, it can indicate a significant impact or shock event. The threshold level can be adjusted based on the desired sensitivity and application requirements.

Once a shock event is detected, the occurrence and associated data, such as the magnitude and duration of the impact, can be analyzed. Depending on the electronic device's capabilities, it can trigger specific responses, such as activating protective mechanisms, signaling an alert, displaying a warning, or notifying the user. Advanced algorithms can analyze the recorded shock data to assess the severity or type of impact. By analyzing acceleration patterns and duration, it is possible to differentiate between different types of shocks, such as an impact of a device after a fall, an impact of the human body on the ground, or a collision.

For example, in a smartwatch equipped with fall detection features, accelerometers can identify when a user has fallen. If a significant impact is detected, the smartwatch can initiate an alert to notify emergency contacts or trigger an automatic emergency response.

Conventionally, the processor of the host device must be always-on to monitor for an occurrence of a shock event continuously. Reducing the workload on the host microcontroller, minimizing the system power consumption, and reducing the latency to measure shock intensity is advantageous.

SUMMARY

Technical advantages are generally achieved by embodiments of this disclosure which describe a method, circuit, and system for shock intensity estimation.

A first aspect relates to a sensor for detecting a shock event. The sensor includes a machine learning core configured to continuously calculate an acceleration norm value based on the change in velocity along one or more axes from an accelerometer. The sensor additionally includes a finite state machine circuit configured to compare the continuously calculated acceleration norm value to a first threshold value and, in response to the continuously calculated acceleration norm value being greater than the first threshold value, generate a first interrupt signal. The finite state machine circuit is further configured to compare the continuously calculated acceleration norm value to a second threshold value less than the first threshold value and, in response to the continuously calculated acceleration norm value being less than or equal to the second threshold value after the first interrupt signal is generated, generate a second interrupt signal. The machine learning core is further configured to calculate a maximum acceleration norm value between the first interrupt signal and the second interrupt signal and store the maximum acceleration norm value in a register. An application processor of a host device reads the maximum acceleration norm value after receiving the second interrupt signal from the sensor. The maximum acceleration norm value is reset after a delay after the second interrupt signal is generated.

A second aspect relates to a system that includes a sensor. The sensor includes a machine learning core configured to continuously calculate an acceleration norm value based on the change in velocity along one or more axes from an accelerometer. The sensor additionally includes a finite state machine circuit configured to compare the continuously calculated acceleration norm value to a first threshold value and, in response to the continuously calculated acceleration norm value being greater than the first threshold value, generate a first interrupt signal. The finite state machine circuit is further configured to compare the continuously calculated acceleration norm value to a second threshold value less than the first threshold value and, in response to the continuously calculated acceleration norm value being less than or equal to the second threshold value after the first interrupt signal is generated, generate a second interrupt signal. The machine learning core is further configured to calculate a maximum acceleration norm value between the first interrupt signal and the second interrupt signal and store the maximum acceleration norm value in a register. An application processor of a host device reads the maximum acceleration norm value after receiving the second interrupt signal from the sensor. The maximum acceleration norm value is reset after a delay after the second interrupt signal is generated.

A third aspect relates to a method for detecting a shock event. The method includes continuously measuring, by a sensor in a host device, acceleration values along multiple directions; continuously calculating, by the sensor, an acceleration norm value based on the acceleration values; comparing, by the sensor, the continuously calculated acceleration norm value to a first threshold value and, in response to the continuously calculated acceleration norm value being greater than the first threshold value, generating a first interrupt signal; comparing, by the sensor, the continuously calculated acceleration norm value to a second threshold value less than the first threshold value and, in response to the continuously calculated acceleration norm value being less than or equal to the second threshold value after the first interrupt signal is generated, generating a second interrupt signal; calculating, by the sensor, a maximum acceleration norm value between the first interrupt signal and the second interrupt signal; storing the maximum acceleration norm value in a register of the sensor, where an application processor of the host device reads the maximum acceleration norm value after receiving the second interrupt signal from the sensor; and resetting the maximum acceleration norm value after a delay after the second interrupt signal is generated.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a sensor in a consumer portable electronic device, such as a smartphone or a smartwatch, it should also be appreciated that these inventive aspects may also apply to a sensor housed in any electronic device that would benefit from a low-consumption, small-footprint shock estimation sensor, such as a drone, gaming controller, a navigation system. In particular, aspects of this disclosure may similarly apply to, for example, various industrial and vehicular applications.

Conventionally, shock intensity estimation has relied on software computation by an application processor (or a microcontroller) in a host device, external to a sensor used to measure the shock event. The application processor is typically configured to continuously read data from an accelerometer, compute a corresponding acceleration norm value, and determine whether a shock event has occurred by calculating a maximum peak value within the shock event. The continuous reading is typically done at a very high sample rate (e.g., several hundred Hertz) for accurate shock detection. The system efficiency is decreased as the accelerometer continuously wakes up the application processor in the conventional configuration.

Embodiments of this disclosure provide a method, circuit, and system that minimizes the activity of the host device by offloading the typical processing done by the application processor to the sensor operating within a low-power domain.

Further, embodiments of this disclosure minimize data latency as the core features related to shock detection measurements and processing are performed within the sensor and without the back-and-forth communication required in the conventional system between the application processor and the sensor.

Aspects of this disclosure provide an interrupt line and a register in the sensor that notify the shock event, which triggers the application processor. The application processor, in turn, after receiving a trigger can access/read the register to gather the shock event data and, if desired, further process the data (e.g., using a neural network, a decision tree, a support vector machine, a random forest, etc.) to determine whether to trigger a response, such as contacting emergency services in response to a vehicular crash detection.

Figure 1:
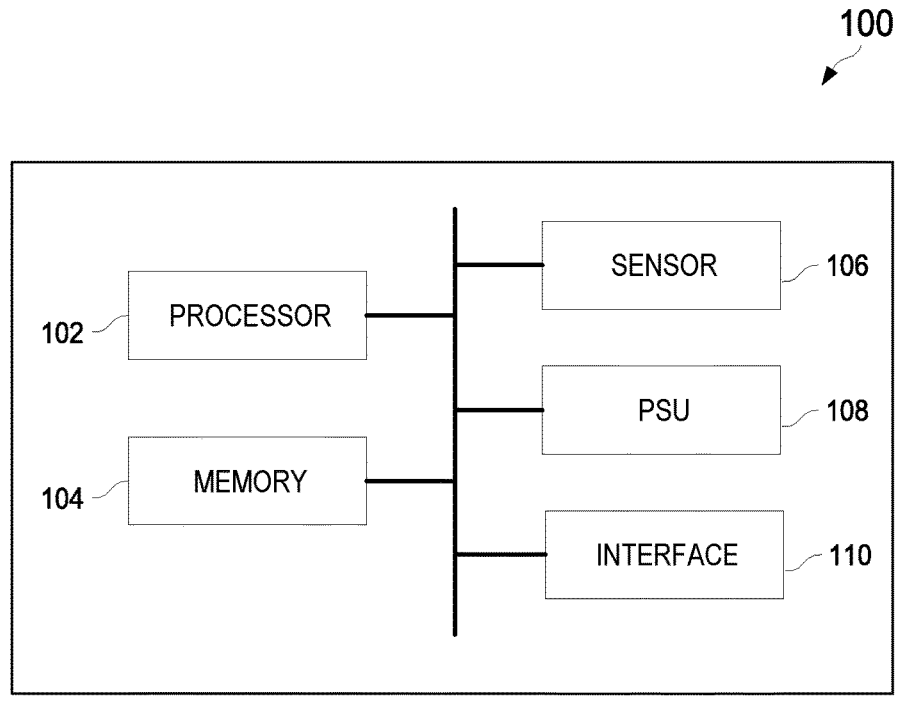
FIG. 1 is a block diagram of an embodiment system.

FIG. 1 illustrates a block diagram of an embodiment system 100. System 100 includes a processor 102, a memory 104, a sensor 106, a power supply unit (PSU) 108, and an interface 110, which may (or may not) be arranged as shown. Although one of each (i.e., the processor 102, the memory 104, the sensor 106, the power supply unit 108, and the interface 110) is shown in FIG. 1, the number of components is not limiting, and greater numbers are similarly contemplated in other embodiments. System 100 may include additional components not depicted, such as long-term storage (e.g., non-volatile memory, etc.), power management circuitry, security and encryption modules (e.g., trusted platform modules (TPM), etc.), or the like. System 100 may be an electronic device, such as a smartphone, a tablet, a laptop, a smartwatch, a vehicle, or any system or sub-system capable of hosting the sensor 106.

In embodiments, each component can communicate with any other component internally within or external to the system 100. For example, each component can communicate using the I$^2$C (alternatively known as I2C or IIC) communication protocol, the serial peripheral interface (SPI) specification, or the like.

Processor 102 may be any component or collection of components adapted to perform computations or other processing-related tasks. In embodiments, processor 102 is an application processor or a microcontroller. Embodiments of this disclosure provide a solution whereby the continuous processing for monitoring a shock event is delegated from processor 102 to sensor 106. Conventionally, processor 102 or certain cores of processor 102 are continuously running to monitor for a shock event. As such, embodiments of this disclosure advantageously reduce power consumption within system 100 by shifting the workload from the processor 102 to the low-power sensor 106, which operates at high efficiency and low power.

In embodiments, processor 102 receives meaningful data from sensor 106 such as shock intensity and duration, which can be further processed by processor 102 to detect, for example, a car crash, a fall detection event, or used for warranty and insurance purposes.

Memory 104 may be any component or collection of components adapted to store programming or instructions for execution by processor 102. In an embodiment, memory 104 includes a non-transitory computer-readable medium.

Figure 2:
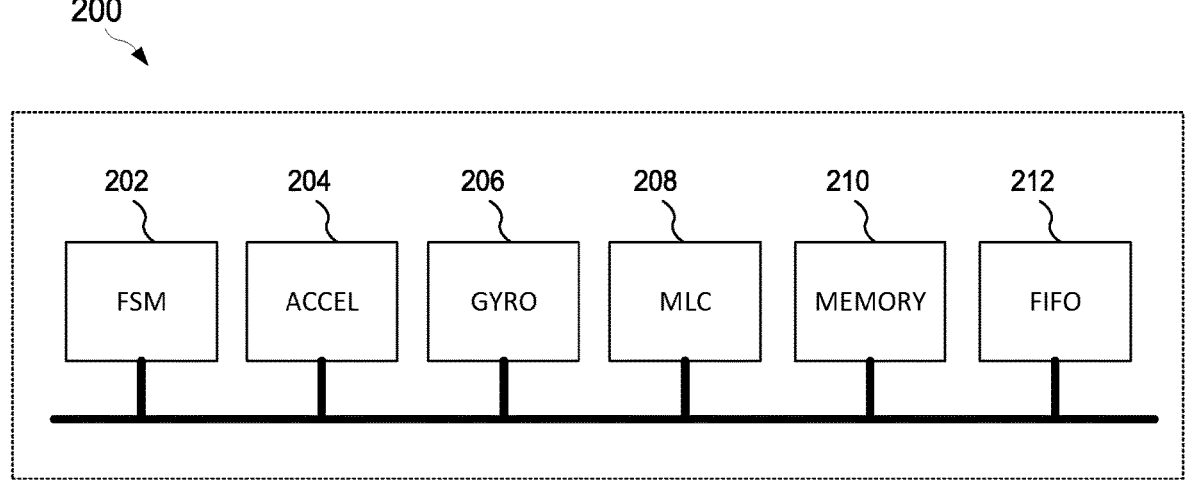
FIG. 2 is a block diagram of an embodiment sensor, which can be implemented in the system of FIG. 1.

Sensor 106, further described in FIG. 2, measures shock intensity corresponding to a shock event on system 100. In embodiments, sensor 106 continuously monitors for a shock event, with minimal to no intervention by processor 102. In embodiments, sensor 106 is configured to detect a shock start event and a shock end event by comparing values from an accelerometer of sensor 106 to a threshold value, storing a maximum value of the acceleration norm between the shock start and shock end events, and disable the shock detection for a period before being re-enabled.

Interface 110 may be any component or collection of components that allow processor 102 to communicate with other devices/components or a user. For example, interface 110 may be adapted to allow a user or sensor 106 to interact/communicate with the system 100. Further, interface 110 may include circuitry that allows system 100 to communicate signals to notify emergency contacts or trigger an automatic emergency response.

FIG. 2 illustrates a block diagram of an embodiment sensor 200, which can be implemented as sensor 106 in system 100. Sensor 200 includes a finite state machine (FSM) circuit 202, an accelerometer 204, a gyroscope 206, a machine learning core (MLC) 208, memory 210, and an optional First-In-First-Out (FIFO) circuit 212, which may (or may not) be arranged as shown. Sensor 200 may include additional components and sensors not shown, such as an analog-to-digital (ADC) converter, a barometer (for measuring atmospheric pressure), or a magnetometer (for measuring magnetic fields). In embodiments, sensor 200 is a single package component within the host device.

The FSM circuit 202 is a digital circuit that implements a finite state machine, a mathematical model used to describe the behavior of the FSM circuit 202 that can exist in a finite number of states. FSM circuit 202 may include one or more state registers, state transition logic, and output logic, and be based on a state transition table or diagram.

FSM circuit 202 is designed to respond to input signals received from the accelerometer 204, and optionally the gyroscope 206, and transition between different states based on predefined rules or conditions. In the FSM circuit 202, the circuit's behavior is divided into a set of discrete states, and the transitions between these states occur in response to inputs. The current state of the FSM (e.g., stored in a state register implemented as flip-flops or other types of sequential logic elements) is determined by the values stored in memory elements, such as flip-flops or registers, within the FSM circuit 202. The input signals and the current state together determine the next state of the system (e.g., using the state transition logic), as defined by a state transition table or state transition diagram—as further detailed below with respect to FIG. 5.

In embodiments, FSM circuit 202 is configured to perform sequences of threshold or timing checks at each state on the data collected from the accelerometer 204 or gyroscope 206 to detect a sequence of movements.

Accelerometer 204 is a sensor that detects a change in velocity (i.e., acceleration) along multiple axes. In embodiments, accelerometer 204 can detect movement in three dimensions: X, Y, and Z axes, corresponding to forward/backward, lateral, and vertical motions. The design of accelerometer 204 can be based on the piezoelectric effect, piezo-resistance, capacitive sensing, or the like. Most accelerometers are minuscule, and they are often referred to as Micro-Electro-Mechanical Systems (MEMS) accelerometers.

In embodiments, accelerometer 204 is configured to detect a shock or impact at a high sample rate of 200 Hertz (Hz), 400 Hz, or 800 Hz (non-limiting). In embodiments, accelerometer 204 may include more than one accelerometer in the sensor 200. For example, accelerometer 204 may include a first accelerometer configured to have a dedicated channel for ±2 g, ±4 g, ±8 g, and ±16 g full scale, and a second accelerometer configured to have a dedicated channel for ±32 g, ±64 g, ±128 g, and ±256 g full scale. In embodiments, the ±16 g channel can detect shock intensity based on an acceleration norm up to ±27.71 g. In embodiments, the ±256 g channel can detect shock intensity based on an acceleration norm up to ±443.4 g. In embodiments, the accelerometer 204 or a second accelerometer of accelerometer 204 is configured to have a maximum full scale of ±300 g and can detect shock intensity based on an acceleration norm up to ±519.6 g.

Gyroscope 206 is a sensor that measures the rotation rate or angular velocity around a particular axis. Gyroscopes are typically based on the principles of angular momentum and gyroscopic effect. In embodiments, gyroscope 206 measures rotational motion along three axes: pitch (tilting up and down), roll (tilting side to side), and yaw (rotation around the vertical axis).

In embodiments, accelerometer 204 and gyroscope 206 provide an analog signal converted to a digital signal (e.g., using an analog to digital converter) for processing to detect, for example, device orientation, triggering safety features like vehicle airbags, fall detection, or to measure impacts on the host device housing the sensor 200.

In embodiments, accelerometer 204 can be used to detect an occurrence of an impact, and the data collected using the accelerometer 204 and gyroscope 206 can be used, individually or in combination, to provide a more accurate and precise estimation about the context in which the shock occurred or the characteristics of the shock. For example, accelerometers are prone to errors due to gravitational forces, while gyroscopes can drift over time. Combining their outputs can help compensate for these limitations. The complementary nature of the two sensors allows for the detection of both linear and rotational movements, providing a more comprehensive understanding of the host device's motion at the time of impact. This sensor fusion technique is commonly used in inertial measurement units (IMUs) or sensor arrays to achieve robust motion tracking in various applications.

MLC 208 can be used for signal processing, such as to filter raw accelerometer data, which can contain noise and unwanted vibrations. Generally, the signal from the accelerometer 204 and the gyroscope 206 are filtered and processed to obtain accurate measurements. Filtering techniques like low-pass or high-pass filters can remove noise or bias and isolate the relevant data. Further, MLC 208 can be used for various computing functions within the sensor 200. For example, the MLC 208 can be used to compute the maximum value of the norm signal from the accelerometer 204, as detailed hereinbelow. In embodiments, the functions performed by MLC 208 are implemented in a generic processor or a specific processor, such as a signal processor or a microcontroller.

In embodiments, memory 210 is used for storing values used by sensor 200 to provide data to processor 102 in system 100. In embodiments, memory 210 may include elements like flip-flops, registers, or other storage elements. Memory 210 can store the maximum acceleration norm value corresponding to a shock event. In some embodiments, memory 210 may include a lookup table or a function look-up that converts the acceleration norm value to a calibrated shock intensity value. In some embodiments, memory 210 is configured to store the acceleration values (e.g., x, y, z axes) used to calculate the maximum acceleration norm value.

FIFO circuit 212 is designed to efficiently manage sequential data flow, where the first data element that enters FIFO circuit 212 is the first to be retrieved or processed by, for example, processor 102 in system 100. FIFO circuit 212 may be implemented as known in the arts. In embodiments, the FIFO circuit 212 may be replaced by a dedicated register within, for example, the memory 210 of sensor 200.

In embodiments, sensor 200 operates autonomously from system 100 and without any intervention by processor 102 (i.e., sensor 200 components are not required to be programmed). In such embodiments, the processing logic to operate and initialize the components of the sensor 200 (e.g., MLC 208, FSM circuit 202) can be implemented as dedicated hardware components.

In embodiments, sensor 200 includes one or more external pads to allow communication of signals with processor 102 (or any other component within system 100). In embodiments, processor 102 is configured to initialize sensor 200.

In embodiments, processor 102 operates as the primary device and sensor 200 acts as an auxiliary device for information communication. In embodiments, after sensor 200 is booted up, processor 102 configures sensor 200 to produce data, for example, at a particular sampling rate, generating interrupts embedded in sensor 200, configuring additional functions and registers, as proposed herein by enabling logic (e.g., for shock event detection, intensity computation, etc.), setting threshold values, and the like.

In embodiments, after processor 102 initially configures sensor 200, the communication between processor 102 and sensor 200 is limited to responding to triggers initiated by sensor 200 using an interrupt signal from sensor 200 to processor 102.

In embodiments, after sensor 200 reports an interrupt to processor 102 using an interrupt signal, processor 102 can access (e.g., read) one or more registers in sensor 200 to gather data related to the shock event (e.g., gyroscope values, maximum acceleration norm value, shock intensity duration, etc.) as computed or stored by, for example, the MLC 208.

In embodiments, sensor 200 is configured to generate a data packet with the various information gathered during the shock event detection and communicate that to processor 102.

Figure 3:
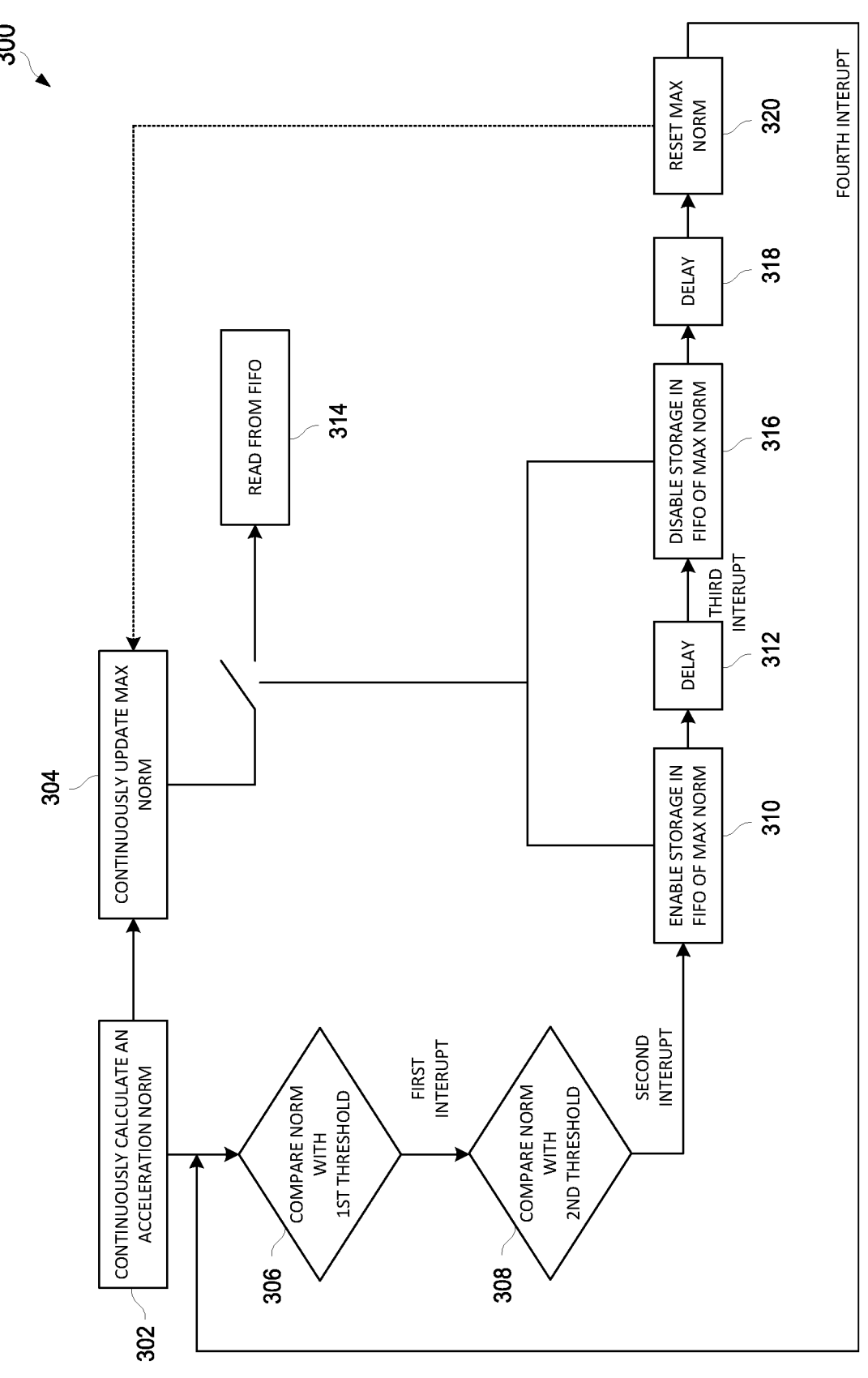
FIG. 3 is a flow chart of an embodiment method for operating the sensor.
Figure 4:
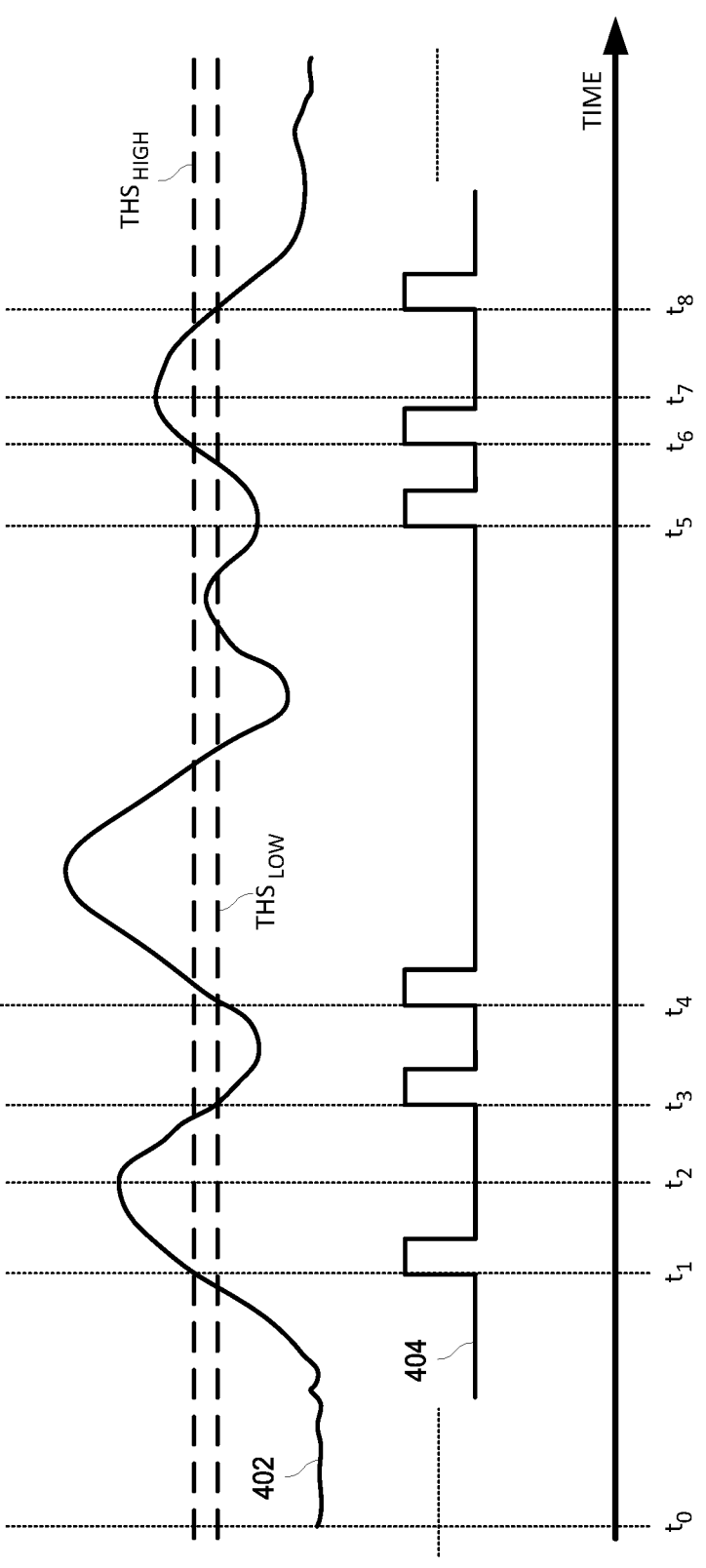
FIG. 4 shows waveforms of embodiment signals.
Figure 5:
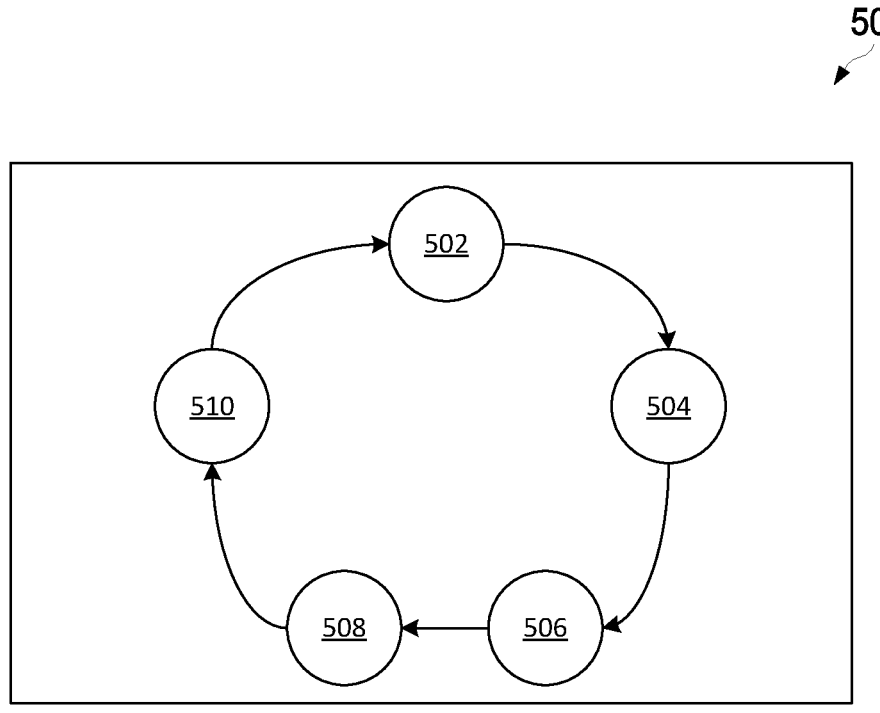
FIG. 5 is a state transition diagram of an embodiment finite state machine circuit, which may be implemented as an FSM circuit in the sensor of FIG. 1.

FIG. 3 illustrates a flow chart of an embodiment method 300 for operating sensor 200. FIG. 4 illustrates waveforms of embodiment signals corresponding to method 300, system 100, and sensor 200. FIG. 5 is a state transition diagram of an embodiment finite state machine circuit 500, which may be implemented as the FSM circuit 202 in the sensor 200.

The operation of sensor 200, implemented as sensor 106 in system 100, is described using method 300 in FIG. 3, the waveforms in FIG. 4, and the state transition diagram in FIG. 5. FIG. 4 includes a first signal 402, corresponding to an acceleration norm value calculation and an interrupt signal 404, corresponding to an interrupt signal generated by, for example, the FSM circuit 202 and provided to the processor 102.

At step 302, MLC 208 continuously calculates an acceleration norm value from the data collected from accelerometer 204. The acceleration norm value calculation refers to determining the magnitude of the acceleration vector from data collected by accelerometer 204. As acceleration is a vector quantity that describes the rate of velocity change over time, it has both magnitude (the amount of acceleration) and direction. The acceleration norm value calculation provides a single value representing the magnitude of the acceleration measurements, regardless of direction.

The acceleration norm value can be calculated using the Euclidean norm, also known as the $L^2$ norm or the magnitude of a vector. For a three-dimensional acceleration vector (x, y, z), the Euclidean norm (n) value can be calculated as follows: $n=\sqrt{x^2+y^2+z^2}$, which involves taking the square of each component of the acceleration vector, summing them, and then taking the square root of the result. In embodiments, at step 302, MLC 208 calculates the acceleration norm from the three dimensions: x, y, and z at each moment in time (digitalized based on the sensor circuitry).

In some embodiments, the acceleration norm can be calculated using only one or two directions. For example, the accelerometer 204 may be configured to measure acceleration in only the forward/backward and lateral directions.

In such an example, the acceleration norm (n) can be calculated by MLC 208 using the equation: $n=\sqrt{x^2+y^2}$.

In other embodiments, software or hardware configurable weight multipliers (i.e., coefficients) can emphasize a hierarchy in one of the directions for calculating a modified acceleration norm value. For example, the modified acceleration norm value (n') can be calculated as follows: $n'=\sqrt{\alpha x^2+\beta y^2+\gamma z^2}$, where $\alpha$ corresponds to a weight factor for the z direction, $\beta$ corresponds to a weight factor for the y direction, and $\gamma$ corresponds to a weight factor for the z direction. Thus, assigning different values to the weight factors can accentuate measurements in a particular direction to suit the application's needs. Of course, embodiments are also contemplated, where equal weight factors or a zero-value weight factor have been assigned.

In embodiments, MLC 208 calculates the maximum acceleration norm value using recursive (i.e., iteratively updated) features (i.e., recursive attributes, recursive variables). In such embodiments, the maximum acceleration norm value is calculated based on previous values (i.e., sample by sample); thus, no decay factor is applied to avoid discharging the value and retaining the maximum value.

Recursive features are commonly used in time series analysis and sequential data modeling, where the current value of a variable is influenced by its past values. These features capture temporal dependencies and provide a way to incorporate historical information into the analysis. In embodiments, the decay factor (i.e., configurable coefficient) is set by processor 102 during the boot-up sequence while configuring sensor 200.

In these embodiments, MLC 208 computes the maximum, minimum, peak-to-peak recursive values, or a combination thereof. The maximum and minimum recursive values are set equal to the input value when higher or lower than the current value. Otherwise, the maximum and minimum values decay with a configurable coefficient.

For example, to calculate the maximum acceleration norm value, if the present calculated acceleration norm value ($in_i$) is greater than the previous maximum acceleration norm value ($Max_{i-1}$), then the present maximum acceleration norm value ($Max_i$) equals the present calculated acceleration norm value ($in_i$) (i.e., $Max_i=in_i$) and the max coefficient ($c_{max}$) is set to the initial decay coefficient (i.e., $c_{max}=c_{decay}$).

Otherwise, if the present calculated acceleration norm value ($in_i$) is less than or equal to the previous maximum acceleration norm value ($Max_{i-1}$), the present maximum acceleration norm value ($Max_i$) equals the previous maximum acceleration norm value ($Max_{i-1}$) multiplied by a current decay coefficient ($c_{max}$) (i.e., $Max_i=Max_{i-1}\times c_{max}$, where $c_{max}=c_{decay}\times c_{max}$).

As another example, to calculate the minimum acceleration norm value, if the present calculated acceleration norm value ($in_i$) is less than the previous minimum acceleration norm value ($Min_{i-1}$), then the present minimum acceleration norm value ($Min_i$) equals the present calculated acceleration norm value ($in_i$) (i.e., $Min_i=in_i$) and the min coefficient ($c_{min}$) is set to the initial decay coefficient (i.e., $c_{min}=c_{decay}$).

Otherwise, if the present calculated acceleration norm value ($in_i$) is greater than or equal to the previous minimum acceleration norm value ($Min_{i-1}$), the present minimum acceleration norm value ($Min_i$) equals the previous minimum acceleration norm value ($Min_{i-1}$) multiplied by a current decay coefficient ($c_{min}$) (i.e., $Min_i=Min_{i-1}\times c_{min}$, where $c_{min}=c_{decay}\times c_{min}$).

The peak-to-peak value ($Pk2pk_i$) can be calculated as the difference between the present maximum acceleration norm value ($Max_i$) and the present minimum acceleration norm value ($Min_i$) (i.e., $Pk2pk_i=Max_i-Min_i$).

Thus, it should be appreciated that the method of calculating the acceleration norm value is non-limiting, and various ways can be contemplated based on the application.

In embodiments, in addition to or instead of the maximum acceleration norm value, other signal features are continuously calculated or extracted from sensor 200. For example, signal features such as the mean, variance, energy, maximum, minimum, peak-to-peak of any accelerometer or gyroscope axis or of the accelerometer or gyroscope norm are continuously calculated or extracted from sensor 200. In embodiments, one or more of these values are stored in, for example, a register or memory storage of the sensor accessible to processor 102.

In embodiments, the MLC 208 filters out noise or bias and isolates relevant acceleration data for each axis before calculating the acceleration norm value. In some embodiments, MLC 208 filters out noise or bias and isolates relevant acceleration data after calculating the acceleration norm value.

In embodiments, at step 304, after each acceleration norm value calculation, the calculated value is compared with the value stored in memory 210. In embodiments, in response to the acceleration norm value calculated at step 302 being greater than the value stored in memory 210, the value in memory 210 is updated to reflect the maximum acceleration norm value. In embodiments, the corresponding acceleration values (e.g., x, y, z axes) for the updated maximum acceleration norm value are stored in memory 210.

At step 306, FSM circuit 202 operates in a first state 502. Between times $t_0$ and $t_3$ or $t_5$ and $t_8$, FSM circuit 202 compares a first threshold value (i.e., $THS_{HIGH}$) with each acceleration norm value calculation to determine when the acceleration norm exceeds the first threshold value. At times $t_1$ and $t_6$, in response to the FSM circuit 202 determining that the acceleration norm value is greater than the first threshold value, FSM circuit 202 asserts a first interrupt by transitioning the value of the interrupt signal 404 from a logic low state to a logic high state for a set amount of time. Moreover, FSM circuit 202 transitions from the first state 502 to the second state 504.

In embodiments, a first value (e.g., 0x02) is recorded in a register of sensor 200 right before generating the first interrupt. In response to processor 102 receiving the first interrupt, processor 102 accesses the register, which includes the first value indicating to processor 102 that the trigger from the interrupt signal 404 indicates a shock start event.

In embodiments, the value stored in memory 210 is not updated until the first interrupt is generated at the interrupt signal 404. In such embodiments, each calculated acceleration norm value is compared to the first threshold, and only after the calculated value is greater than the first threshold does the register in memory 210 get updated to reflect the maximum acceleration norm value.

At step 308, between times $t_1$ and $t_3$ or $t_6$ and $t_8$, FSM circuit 202 compares a second threshold value (i.e., $THS_{LOW}$) with each acceleration norm value calculation to determine when the acceleration norm equals or is less than the second threshold value. The second threshold value is less than the first threshold value.

In embodiments, the first and second threshold values are set by processor 102 during the boot-up sequence while configuring sensor 200. In an embodiment, the first threshold value equals 20 g, and the second threshold value equals 19 g.

Further, the maximum acceleration norm value stored in memory 210 continues to be updated after each acceleration norm value calculation when the calculated value exceeds the value stored in memory 210 (see step 304). As the maximum acceleration norm value for the first signal 402 occurs at time $t_2$ for the duration between $t_0$ and $t_3$, and at time $t_7$ for the duration between $t_5$ and time $t_7$, the value stored in memory 210 reflects the acceleration norm value calculated, respectively, at times $t_2$ and $t_7$ at each shock event.

At times $t_3$ and $t_8$, in response to FSM circuit 202 determining that the acceleration norm value is less than or equal to the second threshold value, FSM circuit 202 asserts a second interrupt by transitioning the value of the interrupt signal 404 from the logic low state to the logic high state for a set amount of time. Moreover, FSM circuit 202 transitions from the second state 504 to the third state 506. In embodiments, the value stored in memory 210 is prevented from being updated after the second interrupt is generated at the interrupt signal 404.

In embodiments, a second value (e.g., 0x01) is recorded in the register of sensor 200, which previously stored the first value, right before generating the second interrupt. In response to processor 102 receiving the second interrupt, processor 102 accesses the same register, which now includes the second value indicating to processor 102 that the trigger from the interrupt signal 404 is indicative of a shock end event and to enable storage of the maximum acceleration norm value into a memory element of the FIFO circuit 212, as detailed in step 310.

In embodiments, FSM circuit 202 calculates the shock duration (e.g., the time between $t_1$ and $t_3$ or $t_6$ and $t_8$) corresponding to a time duration between the first and second interrupts using an internal counter (i.e., hardware). In other embodiments, processor 102 can calculate the time duration based on the difference between receiving the first and second interrupt in the interrupt signal 404.

In embodiments, other signal features are calculated or extracted from sensor 200 between the generating of the first interrupt and the second interrupt. For example, signal features such as the mean, variance, energy, maximum, minimum, peak-to-peak of any accelerometer or gyroscope axis or of the accelerometer or gyroscope norm are calculated or extracted from sensor 200 for the period between the first interrupt and the second interrupt.

At step 310, in response to receiving the second interrupt signal, processor 102 enables storage of the maximum acceleration norm value into the memory element of the FIFO circuit 212, which results in the maximum acceleration norm value being copied from the memory 210 to the memory element of the FIFO circuit 212.

In embodiments, additional data are copied from memory 210 to the memory element of the FIFO circuit 212, such as the acceleration values (e.g., x, y, z values), the gyroscope values, and the like, corresponding to the maximum acceleration norm value. In embodiments, calculated or extracted signal features such as the mean, variance, energy, maximum, minimum, peak-to-peak of any accelerometer or gyroscope axis or of the accelerometer or gyroscope norm for the period between the first interrupt and the second interrupt are copied from memory 210 to the memory element of FIFO circuit 212.

In embodiments, the calculated shock duration value is stored in the same FIFO entry as the maximum acceleration norm value of the FIFO circuit 212. In embodiments, values stored in the memory element of FIFO circuit 212 or a register accessible by processor 102 are stored in an integer format (e.g., two's complement, sign-magnitude, etc.), a half-precision (i.e., 16-bit), single-precision (i.e., 32-bit), or double-precision (i.e., 64-bit) floating-point format.

At step 312, the FSM circuit 202, which is in the third state 506, after the passage of a first period (e.g., delay), asserts a third interrupt at time $t_4$ by transitioning the value of the interrupt signal 404 from the logic low state to the logic high state for a set amount of time. In embodiments, the first period equals a set number of samples (e.g., 1 to 5), or time intervals (e.g., 2 to 10 milliseconds). In embodiments, the delay value is configurable by processor 102 during the sensor boot-up sequence while configuring sensor 200.

The third interrupt indicates to processor 102 that the maximum acceleration norm value is copied into the memory element of the FIFO circuit 212. Moreover, FSM circuit 202 transitions from the third state 506 to the fourth state 508.

In embodiments, a third value (e.g., 0x00) is recorded in the register of sensor 200, which previously stored the first and second values, right before generating the third interrupt. In response to processor 102 receiving the third interrupt, processor 102 accesses the same register, which now includes the third value indicating to processor 102 that the trigger from the interrupt signal 404 is indicative of a signal to processor 102 to disable storage of the maximum acceleration norm value into the memory element of FIFO circuit 212, as detailed in step 316.

At step 316, processor 102 disables storage of the maximum acceleration norm value into the memory element of FIFO circuit 212 in response to receiving the third interrupt. In embodiments, at step 314, processor 102 reads the value stored in the FIFO circuit 212 after receiving the third interrupt. In other embodiments, at step 314, processor 102 reads the value stored in FIFO circuit 212 after processor 102 disables storage of the maximum acceleration norm value into the memory element of FIFO circuit 212.

In embodiments, at step 316, processor 102 reads the maximum acceleration norm value; the shock duration value; acceleration values; gyroscope values; mean, variance, energy, maximum, minimum, peak-to-peak of any accelerometer or gyroscope axis or of the accelerometer or gyroscope norm for the period between the first interrupt and the second interrupt, or any combination thereof, stored in FIFO circuit 212.

In embodiments, the enabling and disabling of the FIFO circuit 212 to allow for the transfer of the maximum acceleration norm value (and other data) to the memory element of the FIFO circuit 212, is performed internally within the sensor 200 (i.e., autonomously), and without the intervention of processor 102. In such embodiments, processor 102 would access sensor 200 to access data (e.g., maximum acceleration norm value, shock duration, accelerometer data, gyroscope data, etc.) based on trigger events generated by the FIFO circuit 212 (e.g., a new sample is available in the memory element of the FIFO circuit, the number of samples stored in the memory element of the FIFO circuit reached a selected user threshold, the memory element of the FIFO circuit is full, etc.).

In embodiments where the enabling and disabling of the FIFO circuit 212 to allow for the transfer of the maximum acceleration norm value to the memory element of the FIFO circuit 212 is performed internally within the sensor 200 or where a dedicated register replaces the FIFO circuit 212, steps 310, 312 and 316 become optional. The value or values stored in memory 210 (e.g., maximum acceleration norm value) remain or are shifted to another register accessible to processor 102. The accessible stored value or values (e.g., maximum acceleration norm value) are not modifiable after generating the second interrupt. The value or values are reset and modifiable after the fourth interrupt is generated at step 320.

At step 318, FSM circuit 202, which is in the fourth state 508, after the passage of a second period (e.g., delay), asserts a fourth interrupt at time $t_5$ by transitioning the value of the interrupt signal 404 from the logic low state to the logic high state for a set amount of time. Moreover, FSM circuit 202 transitions from the fourth state 508 to the fifth state 510. In embodiments, the second period equals a set number of samples (e.g., 1500 samples), or time intervals (e.g., three seconds). In embodiments, the second delay value is configurable by processor 102 during the sensor boot-up sequence while configuring sensor 200.

In embodiments, a fourth value (e.g., 0x03) is recorded in the register of sensor 200, which previously stored the first, second, and third values, right before generating the fourth interrupt. In response to processor 102 receiving the fourth interrupt, processor 102 accesses the same register, which now includes the fourth value indicating to processor 102 that the trigger from the interrupt signal 404 indicates the beginning of the next shock event detection (i.e., reset of the maximum acceleration norm value and the restart of the process), as detailed in step 320.

At step 320, FSM circuit 202, which is in the fifth state 510, resets the maximum acceleration norm value stored in memory 210 and transitions to the first state 502. The fourth interrupt indicates to processor 102 of the reset that the detection for the next shock has begun.

In embodiments, the first and second delays are set such that the duration between time $t_3$ and time $t_5$ equals three seconds. The configurable delay values allow the processor sufficient time to enable the FIFO circuitry 212 and wait for the shock intensity value being copied into the FIFO circuitry 212 memory before disabling the FIFO circuitry 212, and allow the processor to acquire the sensors data (e.g., maximum acceleration norm value, shock duration, accelerometer data, gyroscope data, etc.) for the desired time for further computations.

It is noted that in FIG. 4, the maximum acceleration norm value within times $t_3$ and $t_5$ is greater than the maximum acceleration norm values between times $t_1$ and $t_3$ or times $t_6$ and $t_8$, the value corresponding to this acceleration norm calculation, however, is discarded because it occurred during the delay between the second interrupt and the fourth interrupt.

This disclosure's embodiments provide a low-power, autonomously operating sensor that can detect and signal a shock event to an application processor of a host device. Advantageously, the application processor is no longer required to read and process the accelerometer data to compute the maximum acceleration norm value or the duration of the shock event. As such, the communication between the application processor and the sensor is kept to a minimum, which allows the application processor to focus on other tasks or enter into sleep mode (i.e., low-power setting). The system efficiency is improved as the shock measurements are computed in a low-power domain (e.g., running completely in hardware) and independently from the application processor in the host device. Moreover, as the shock data (e.g., shock duration, maximum shock intensity, etc.) is made available to the application processor, the host device can perform additional computations if desired.

It is noted that all steps outlined in the flow charts of the methods disclosed herein are not necessarily required and can be optional. Further, changes to the arrangement of the steps, removal of one or more steps and path connections, and addition of steps and path connections are similarly contemplated.

A first aspect relates to a sensor for detecting a shock event. The sensor includes a machine learning core configured to continuously calculate an acceleration norm value based on the change in velocity along one or more axes from an accelerometer. The sensor additionally includes a finite state machine circuit configured to compare the continuously calculated acceleration norm value to a first threshold value and, in response to the continuously calculated acceleration norm value being greater than the first threshold value, generate a first interrupt signal. The finite state machine circuit is further configured to compare the continuously calculated acceleration norm value to a second threshold value less than the first threshold value and, in response to the continuously calculated acceleration norm value being less than or equal to the second threshold value after the first interrupt signal is generated, generate a second interrupt signal. The machine learning core is further configured to calculate a maximum acceleration norm value between the first interrupt signal and the second interrupt signal and store the maximum acceleration norm value in a register. An application processor of a host device reads the maximum acceleration norm value after receiving the second interrupt signal from the sensor. The maximum acceleration norm value is reset after a delay after the second interrupt signal is generated.

In a first implementation form of the sensor according to the first aspect as such, the finite state machine circuit is further configured to calculate a shock event duration corresponding to the generating of the first interrupt signal and the second interrupt signal and store the shock event duration in the register.

In a second implementation form of the sensor according to the first aspect as such or any preceding implementation form of the first aspect, the application processor reads the maximum acceleration norm value and the shock event duration from the sensor.

In a third implementation form of the sensor according to the first aspect as such or any preceding implementation form of the first aspect, the acceleration norm value is calculated using the Euclidean norm. The maximum acceleration norm value is calculated using a recursive function.

In a fourth implementation form of the sensor according to the first aspect as such or any preceding implementation form of the first aspect, the sensor further includes a First-In-First-Out (FIFO) circuit. The maximum acceleration norm value is copied into a memory element of the FIFO circuit in response to the second interrupt signal being generated. The application processor accesses the memory element of the FIFO circuit to read the maximum acceleration norm value.

In a fifth implementation form of the sensor according to the first aspect as such or any preceding implementation form of the first aspect, the delay is a first delay. The finite state machine circuit is further configured to generate a third interrupt signal after a second delay less than the first delay. The third interrupt signal indicates to the application processor that the maximum acceleration norm value is copied into the memory element of the FIFO circuit.

In a sixth implementation form of the sensor according to the first aspect as such or any preceding implementation form of the first aspect, the finite state machine circuit is further configured to generate the first delay after the second interrupt signal is generated and generate a fourth interrupt signal after the first delay to indicate that the maximum acceleration norm value is reset and the sensor is monitoring for a next shock event.

A second aspect relates to a system that includes a sensor. The sensor includes a machine learning core configured to continuously calculate an acceleration norm value based on the change in velocity along one or more axes from an accelerometer. The sensor additionally includes a finite state machine circuit configured to compare the continuously calculated acceleration norm value to a first threshold value and, in response to the continuously calculated acceleration norm value being greater than the first threshold value, generate a first interrupt signal. The finite state machine circuit is further configured to compare the continuously calculated acceleration norm value to a second threshold value less than the first threshold value and, in response to the continuously calculated acceleration norm value being less than or equal to the second threshold value after the first interrupt signal is generated, generate a second interrupt signal. The machine learning core is further configured to calculate a maximum acceleration norm value between the first interrupt signal and the second interrupt signal and store the maximum acceleration norm value in a register. An application processor of a host device reads the maximum acceleration norm value after receiving the second interrupt signal from the sensor. The maximum acceleration norm value is reset after a delay after the second interrupt signal is generated.

In a first implementation form of the system according to the second aspect as such, the sensor operates autonomously from the application processor.

In a second implementation form of the system according to the second aspect as such or any preceding implementation form of the second aspect, the application processor is configured to calculate a shock event duration corresponding to a duration between the receiving of the first interrupt signal and the second interrupt signal.

In a third implementation form of the system according to the second aspect as such or any preceding implementation form of the second aspect, the acceleration norm value (n) is calculated using the equation: $n=\sqrt{\alpha x^2+\beta y^2+\gamma z^2}$, where x, y, and z are different components of an acceleration vector, wherein $\alpha$ corresponds to a weight factor for the x direction, $\beta$ corresponds to a weight factor for the y direction, and $\gamma$ corresponds to a weight factor for the z direction. The weight factors are configurable.

In a fourth implementation form of the system according to the second aspect as such or any preceding implementation form of the second aspect, the sensor further includes a First-In-First-Out (FIFO) circuit. The maximum acceleration norm value is copied into a memory element of the FIFO circuit in response to the second interrupt signal being generated. The application processor is configured to access the memory element of the FIFO circuit to read the maximum acceleration norm value.

In a fifth implementation form of the system according to the second aspect as such or any preceding implementation form of the second aspect, the delay is a first delay. The finite state machine circuit is further configured to generate a third interrupt signal after a second delay less than the first delay, the third interrupt signal indicating to the application processor that the maximum acceleration norm value is copied into the memory element of the FIFO circuit.

In a sixth implementation form of the system according to the second aspect as such or any preceding implementation form of the second aspect, the finite state machine circuit is further configured to generate the first delay after the second interrupt signal is generated and generate a fourth interrupt signal after the first delay to indicate that the maximum acceleration norm value is reset and the sensor is monitoring for a next shock event.

A third aspect relates to a method for detecting a shock event. The method includes continuously measuring, by a sensor in a host device, acceleration values along multiple directions; continuously calculating, by the sensor, an acceleration norm value based on the acceleration values; comparing, by the sensor, the continuously calculated acceleration norm value to a first threshold value and, in response to the continuously calculated acceleration norm value being greater than the first threshold value, generating a first interrupt signal; comparing, by the sensor, the continuously calculated acceleration norm value to a second threshold value less than the first threshold value and, in response to the continuously calculated acceleration norm value being less than or equal to the second threshold value after the first interrupt signal is generated, generating a second interrupt signal; calculating, by the sensor, a maximum acceleration norm value between the first interrupt signal and the second interrupt signal; storing the maximum acceleration norm value in a register of the sensor, where an application processor of the host device reads the maximum acceleration norm value after receiving the second interrupt signal from the sensor; and resetting the maximum acceleration norm value after a delay after the second interrupt signal is generated.

In a first implementation form of the method according to the third aspect as such, the method further includes calculating, by the sensor, a shock event duration corresponding to the generating of the first interrupt signal and the second interrupt signal; and storing the shock event duration in the register, wherein the application processor reads the shock event duration and the maximum acceleration norm value from the sensor.

In a second implementation form of the method according to the third aspect as such or any preceding implementation form of the third aspect, the acceleration norm value is calculated using the Euclidean norm. The maximum acceleration norm value is calculated using a recursive function.

In a third implementation form of the method according to the third aspect as such or any preceding implementation form of the third aspect, the method further includes copying the maximum acceleration norm value into a memory element of a FIFO circuit in the sensor in response to the second interrupt signal being generated. The application processor accesses the memory element of the FIFO circuit to read the maximum acceleration norm value.

In a fourth implementation form of the method according to the third aspect as such or any preceding implementation form of the third aspect, the delay is a first delay. The method further includes generating a third interrupt signal after a second delay less than the first delay, the third interrupt signal indicating to the application processor that the maximum acceleration norm value is copied into the memory element of the FIFO circuit.

In a fifth implementation form of the method according to the third aspect as such or any preceding implementation form of the third aspect, the method further includes generating the first delay after the second interrupt signal is generated; and generating a fourth interrupt signal after the first delay to indicate to the application processor that the maximum acceleration norm value is reset and the sensor is monitoring for a next shock event.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A sensor for detecting a shock event, the sensor comprising:
   a machine learning core configured to continuously calculate an acceleration norm value based on a change in velocity along one or more axes from an accelerometer; and
   a finite state machine circuit configured to:
      compare the continuously calculated acceleration norm value to a first threshold value and, in response to the continuously calculated acceleration norm value being greater than the first threshold value, generate a first interrupt signal, and
      compare the continuously calculated acceleration norm value to a second threshold value less than the first threshold value and, in response to the continuously calculated acceleration norm value being less than or equal to the second threshold value after the first interrupt signal is generated, generate a second interrupt signal,
   wherein the machine learning core is further configured to calculate a maximum acceleration norm value between the first interrupt signal and the second interrupt signal and store the maximum acceleration norm value in a register,
   wherein an application processor of a host device reads the maximum acceleration norm value after receiving the second interrupt signal from the sensor, and
   wherein the maximum acceleration norm value is reset after a delay after the second interrupt signal is generated.

2. The sensor of claim 1, wherein the finite state machine circuit is further configured to calculate a shock event duration corresponding to the generating of the first interrupt signal and the second interrupt signal and store the shock event duration in the register.

3. The sensor of claim 2, wherein the application processor reads the maximum acceleration norm value and the shock event duration from the sensor.

4. The sensor of claim 1, wherein the acceleration norm value is calculated using a Euclidean norm, and wherein the maximum acceleration norm value is calculated using a recursive function.

5. The sensor of claim 1, further comprising a First-In-First-Out (FIFO) circuit, wherein the maximum acceleration norm value is copied into a memory element of the FIFO circuit in response to the second interrupt signal being generated, and wherein the application processor accesses the memory element of the FIFO circuit to read the maximum acceleration norm value.

6. The sensor of claim 5, wherein the delay is a first delay, wherein the finite state machine circuit is further configured to generate a third interrupt signal after a second delay less than the first delay, the third interrupt signal indicating to the application processor that the maximum acceleration norm value is copied into the memory element of the FIFO circuit.

7. The sensor of claim 6, wherein the finite state machine circuit is further configured to:

generate the first delay after the second interrupt signal is generated; and generate a fourth interrupt signal after the first delay to indicate that the maximum acceleration norm value is reset and the sensor is monitoring for a next shock event.

8. A system, comprising:

a sensor, comprising:

a machine learning core configured to continuously calculate an acceleration norm value based on a change in velocity along one or more axes from an accelerometer, and a finite state machine circuit configured to:

compare the continuously calculated acceleration norm value to a first threshold value and, in response to the continuously calculated acceleration norm value being greater than the first threshold value, generate a first interrupt signal, and compare the continuously calculated acceleration norm value to a second threshold value less than the first threshold value and, in response to the continuously calculated acceleration norm value being less than or equal to the second threshold value after the first interrupt signal is generated, generate a second interrupt signal, wherein the machine learning core is further configured to calculate a maximum acceleration norm value between the first interrupt signal and the second interrupt signal and store the maximum acceleration norm value in a register, and wherein the maximum acceleration norm value is reset after a delay after the second interrupt signal is generated; and an application processor coupled to the sensor, the application processor configured to read the maximum acceleration norm value after receiving the second interrupt signal from the sensor.

9. The system of claim 8, wherein the sensor operates autonomously from the application processor.

10. The system of claim 8, wherein the application processor is configured to calculate a shock event duration corresponding to a duration between the receiving of the first interrupt signal and the second interrupt signal.

11. The system of claim 8, wherein the acceleration norm value (n) is calculated using the equation: $n=\sqrt{\alpha x^2+\beta y^2+\gamma z^2}$, wherein x, y, and z are different components of an acceleration vector, wherein $\alpha$ corresponds to a weight factor for the x direction, $\beta$ corresponds to a weight factor for the y direction, and $\gamma$ corresponds to a weight factor for the z direction, and wherein the weight factors are configurable.

12. The system of claim 8, wherein the sensor further comprises a First-In-First-Out (FIFO) circuit, wherein the maximum acceleration norm value is copied into a memory element of the FIFO circuit in response to the second interrupt signal being generated, and wherein the application processor is configured to access the memory element of the FIFO circuit to read the maximum acceleration norm value.

13. The system of claim 12, wherein the delay is a first delay, wherein the finite state machine circuit is further configured to generate a third interrupt signal after a second delay less than the first delay, the third interrupt signal indicating to the application processor that the maximum acceleration norm value is copied into the memory element of the FIFO circuit.

14. The system of claim 13, wherein the finite state machine circuit is further configured to:

generate the first delay after the second interrupt signal is generated; and generate a fourth interrupt signal after the first delay to indicate that the maximum acceleration norm value is reset and the sensor is monitoring for a next shock event.

15. A method for detecting a shock event, the method comprising:

continuously measuring, by a sensor in a host device, acceleration values along multiple directions;

continuously calculating, by the sensor, an acceleration norm value based on the acceleration values;

comparing, by the sensor, the continuously calculated acceleration norm value to a first threshold value and, in response to the continuously calculated acceleration norm value being greater than the first threshold value, generating a first interrupt signal;

comparing, by the sensor, the continuously calculated acceleration norm value to a second threshold value less than the first threshold value and, in response to the continuously calculated acceleration norm value being less than or equal to the second threshold value after the first interrupt signal is generated, generating a second interrupt signal;

calculating, by the sensor, a maximum acceleration norm value between the first interrupt signal and the second interrupt signal;

storing the maximum acceleration norm value in a register of the sensor, wherein an application processor of the host device reads the maximum acceleration norm value after receiving the second interrupt signal from the sensor; and resetting the maximum acceleration norm value after a delay after the second interrupt signal is generated.

16. The method of claim 15, further comprising:

calculating, by the sensor, a shock event duration corresponding to the generating of the first interrupt signal and the second interrupt signal; and storing the shock event duration in the register, wherein the application processor reads the shock event duration and the maximum acceleration norm value from the sensor.

17. The method of claim 15, wherein the acceleration norm value is calculated using a Euclidean norm, and wherein the maximum acceleration norm value is calculated using a recursive function.

18. The method of claim 15, further comprising copying the maximum acceleration norm value into a memory element of a FIFO circuit in the sensor in response to the second interrupt signal being generated, and wherein the application processor accesses the memory element of the FIFO circuit to read the maximum acceleration norm value.

19. The method of claim 18, wherein the delay is a first delay, the method further comprising generating a third interrupt signal after a second delay less than the first delay, the third interrupt signal indicating to the application processor that the maximum acceleration norm value is copied into the memory element of the FIFO circuit.

20. The method of claim 19, further comprising:
generating the first delay after the second interrupt signal is generated; and
generating a fourth interrupt signal after the first delay to indicate to the application processor that the maximum acceleration norm value is reset and the sensor is monitoring for a next shock event.

* * * * *